United States Patent Office 3,169,994
Patented Feb. 16, 1965

3,169,994
PREPARATION OF TERTIARY ALKYL AMINES
Gustave Roy, Versailles, Louis Colson, Vitry-sur-Seine, and Maurice Decuypere, Choisy-le-Roi, France, assignors to Commissariat à l'Energie Atomique, Paris, France
No Drawing. Filed July 21, 1961, Ser. No. 125,671
Claims priority, application France, Aug. 10, 1960, 835,547
3 Claims. (Cl. 260—583)

This invention relates to a process for the preparation of tertiary amines.

It relates particularly, but not exclusively, to a process for preparing trialkylamines in which the three alkyl groups are identical and are each constituted by an alkyl radical having at least six carbon atoms, since it is with such amines that the invention would appear to be of greatest interest.

It is a general object of the invention to modify the preparation of tertiary amines so that it corresponds better than heretofore to various practical requirements and particularly so that the desired trialkylamines can be obtained in a simple manner and in good yields.

According to the invention, a process is provided for the preparation of tertiary amines of the trialkylamine type, which comprises reacting a monoalkylamine and/or a dialkylamine with at least one alkyl bromide in the presence of gaseous ammonia, the alkyl radicals of the reactants having at least six carbon atoms and being those of the trialkylamine to be prepared, the reaction mixture being heated to a temperature from 120° C. to 175° C.

In the reaction, the ammonia acts as an acceptor for the hydrogen bromide formed by the action of the alkyl bromide on the amine or amines.

Preferably, the reaction is carried out in the presence of a catalyst derived from copper. The presence of a catalyst is not essential, but it enables operation to be effected at a temperature approximately 15° C. below the temperature of the reaction in the absence of a catalyst, which is particularly advantageous since the instability of the desired amines increases very rapidly with temperature.

The invention more particularly concerns a method of operation, applied to the preparation of amines having three identical hydrocarbon radicals each having eight to eighteen carbon atoms, such amines being utilisable as ion exchangers, for example in the purification of solutions of uranium or other actinides.

It is known that long-chain trialkylamines namely, those in which the alkyl groups include a large number of carbon atoms, for example, more than six, can be obtained, by treating monoalkylamines or dialkylamines with alkyl bromides in the presence of alkali metal hydroxides or carbonates (for example, potassium hydroxide or sodium carbonate), which act as hydrogen bromide acceptors, but the yields of the tertiary amine are very low, because of the considerable formation of an ethylenic hydrocarbon by dehydrobromination of alkyl bromide (dehydrobromination consists in the evolution of hydrogen bromide, with formation of a double bond between the two vicinal carbon atoms which have respectively released a bromine atom and a hydrogen atom).

It is also known that copper and its salts, more particularly cuprous iodide, act as catalysts which favour the replacement of a halogen atom by an amine radical. However, cuprous iodide cannot be used in the presence of a hydrogen halide acceptor of alkaline character, because the iodide is decomposed by alkalies.

The inventors have made the surprising discovery that trialkylamines can be obtained in excellent yields, particularly trialkylamines in which the alkyl radicals have more than six carbon atoms (and particularly with very little formation of ethylenic hydrocarbons), by the action of alkyl bromides on monoalkylamines or dialkylamines, by heating the mixture of alkyl bromides and amines to about 120°–160° C. in the presence of gaseous ammonia, which acts preferentially as a hydrogen bromide acceptor without notably reacting with the alkyl bromides (with the formation of amines), in a way not previously obtainable.

The catalyst, for instance cuprous iodide, is used in the usual catalytic proportions, preferably about 1% by weight of the reaction mixture.

The gaseous ammonia also has the advantage of not materially decomposing the cuprous iodide. The use of cuprous iodide is particularly advantageous, since it appears that the catalytic action of the copper ion is added to that of the iodine ion, which tends to replace the bromine to form an alkyl iodide which is more reactive than the alkyl bromide. The steric hindrance of iodine, which is less than that of bromine, enhances the reactivity.

In the case where the reaction produces a tertiary amine having three identical hydrocarbon radicals, it can be written as:

(a) When starting with a monoalkylamine (or primary amine):

$$RNH_2 + 2RBr + 2NH_3 \rightarrow R_3N + 2NH_4Br$$

(b) When starting with a symmetrical dialkylamine (or secondary amine):

$$R_2NH + RBr + NH_3 \rightarrow R_3N + NH_4Br$$

The alkyl radical of the bromide is frequently the same as that of the amine, but it can be different. Also, the two alkyl radicals of a secondary amine employed can be the same or different.

In the most general case, the reactions can be written as:

(1)
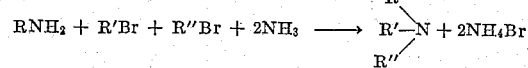

with, as a particular case not previously mentioned:

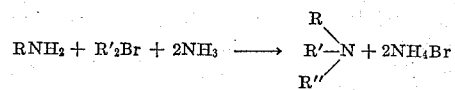

(2)
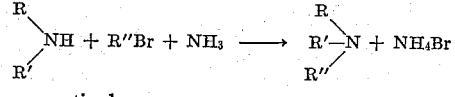

with, as particular cases:

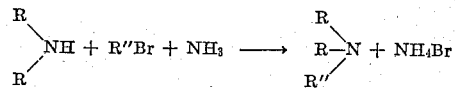

and:

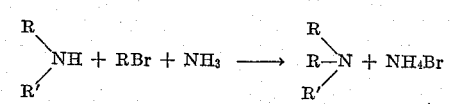

In order that the velocity and yield of the reaction with respect to the mono- or dialkylamine should be high and to compensate for the inevitable slight dehydrobromination of the alkyl bromide, it is advantageous to employ a slight excess of this reactant, of the order of 5% to 10% (molar) in relation to the stoichiometric proportion.

The reaction preferably takes place at atmospheric pressure, at a temperature between about 120° C. and 160° C., in the presence of about 0.1 mole of cuprous iodide per mole of amine used as a reactant.

In the absence of a catalyst, it is necessary to heat to 165°–175° C. and, at these temperatures, appreciable quantities of ethylenic hydrocarbons form by dehydrobromination of the alkyl bromide, the yield of tertiary amine being much lower.

It is preferable not to begin introducing the gaseous ammonia until the time when the reaction mixture has reached the reaction temperature. The absorption of ammonia is then very rapid and complete. At least one litre of ammonia per minute (measured under normal conditions of temperature and pressure) can be absorbed per litre of mixture, if the agitation is sufficiently vigorous.

On beginning the introduction of the ammonia, ammonium bromide begins to precipitate. In the anhydrous reaction medium, this salt can take the form of very fine microcrystals, wihch make the reaction medium very viscous and difficult to agitate towards the end of the reaction. Also, the ammonium bromide precipitate can be very difficult to separate by filtration. These difficulties can be avoided by adding a little water to the reaction medium at the end of the reaction, which has the effect of enlarging the ammonium bromide crystals, which thus become readily filterable.

In these conditions, the yields of the trialkylamine relative to the monoalkylamine or relative to the dialkylamine reach 95% of the theoretical and the formation of ethylenic hydrocarbons is minimal.

Examples of the process of the invention are described below, by way of illustration. The steps described in the examples are to be considered as part of the invention, though any other equivalent steps can also be used without exceeding the scope thereof.

*Example I.—Preparation of trilaurylamine by reaction of lauryl bromide on monolaurylamine in the presence of ammonia and cuprous iodide*

92.5 g. (0.5 mole) of monolaurylamine, 274 g. (1.1 moles) of lauryl bromide, i.e. a 10% excess with respect to the stoichiometric proportion, and 1 g. (about 0.1 mole per mole of base) of cuprous iodide were introduced into a 1-litre, 3-neck, ground-joint flask provided with very efficient agitation, an ammonia inlet tube terminating at the bottom of the flask, a thermometer and an upright reflux condenser.

The agitator was started and the reaction mixture was heated to 150°–160° C., whereupon ammonia was introduced (about 200 bubbles/minute). Precipitation of microcrystalline ammonium bromide occurred, which made the medium very viscous and difficult to agitate efficiently. 1 ml. of distilled water was added to enlarge the crystals of ammonium bromide; the reaction medium became more fluid and easier to agitate. After heating for 2½ hours with ammonia input, the amount of gas leaving the flask was the same as the input (the amounts being measured under the same conditions of temperature and pressure).

The reaction mixture was allowed to cool, filtered on paper and the filtrate (organic layer) was washed with water, then with a normal potash solution and finally again with water. If decantation is found to be too difficult, because of the formation of emulsions, the water can be replaced by methanol to facilitate this operation.

The precipitate recovered on the filter, consisting mainly of ammonium bromide, was dissolved in water and the aqueous phase so obtained was extracted with ether. The ethereal layer was separated and, after eliminating the ether by evaporation, the residue was united with the organic phase previously obtained by washing the filtrate.

The organic mixture so obtained was distilled under vacuum, which allowed the following to be successively recovered:

(1) At 90°–98° C./0.6 mm. of mercury: 15.5 g. of a mixture of unreacted monolaurylamine and lauryl bromide;

(2) At 187°–193° C./0.6 mm. of mercury: 19.4 g. of dilaurylamine;

(3) At 225° C./0.25 mm. of mercury: 237.2 g. of trilaurylamine titrating as 100% with perchloric acid, with a residue of 9 g. which remains in the column and is probably virtually all trilaurylamine.

The trilaurylamine was thus obtained at an overall conversion of 91% with respect to the monolaurylamine and in a yield of 97.5%, taking into account the lauryl bromide, monolaurylamine and dilaurylamine recovered. Dehydrobromination of the lauryl bromide was thus negligible.

*Example II.—Preparation of trilaurylamine by the reaction of lauryl bromide on dilaurylamine, in the presence of ammonia and cuprous iodide*

33.3 g. (0.1 mole) of dilaurylamine, 27.4 g. (0.11 mole) of lauryl bromide, namely an excess of 10% with respect to the theoretical proportion, and 0.2 g. (about 0.01 mole per mole of base) of cuprous iodide were introduced into an apparatus identical with that described and used in Example I.

Agitation was started and the reactants were heated to 150° C., whereupon ammonia was introduced (150–200 bubbles/min.). When the reaction medium became pasty, through the formation of an extensive microcrystalline precipitate of ammonium bromide, several mls. of distilled water were added to enlarge the microcrystals. After heating for 3½ hours with ammonia input, the absorption of ammonia became nil.

The mixture was filtered cold and the filtrate was washed with water, then with a methanolic potash solution (5.6 g. potassium hydroxide in 60 ml. of methanol) and again with water until neutral to phenolphthalein.

The precipitate recovered on the filter, which was mainly ammonium bromide, was dissolved in water and the aqueous phase obtained was extracted with ether. The ethereal layer was separated and, after eliminating the ether by evaporation, about 5 g. of a residue was obtained, constituted by a yellowish viscous oil which was united with the organic phase previously obtained by washing the filtrate.

The organic mixture so obtained was distilled under vacuum, which allowed the following to be successively recovered:

(1) At 90°–93° C./0.5 mm. of mercury: 3.5 g. of unreacted lauryl bromide;

(2) At 187°–190° C./0.5 mm. of mercury: 2.5 g. of unreacted dilaurylamine;

(3) At 225° C./0.2 mm. of mercury: 46.9 g. of trilaurylamine, titrating as 99.7% with perchloric acid, at 0.5 g. of residue (returned to column).

The trilaurylamine was thus obtained at an overall conversion of 90% with respect to the dilaurylamine and in a yield of 96.5%, taking into account the lauryl bromide and dilaurylamine recovered.

Under these operating conditions, it may be mentioned that no appreciable quantities of monolaurylamine form by interaction of the ammonia and lauryl bromide.

*Example III.—Preparation of laurylditridecylamine by reaction of lauryl bromide on ditridecylamine in the presence of gaeous ammonia and cuprous iodide*

76.4 g. (0.2 mole) of ditridecylamine, 53.2 g. (0.22 mole) of lauryl bromide and 0.4 g. (0.01 mole) of cuprous iodide were introduced into an apparatus identical with that of Example II. Agitation was started; the mixture was heated to 160° C., whereupon a stream of ammonia was introduced. After heating for three hours at 155°–160° C., the absorption of ammonia became negligible. After cooling, the ammonium bromide precipitate was filtered off. A dilute organic layer was extracted with ether, which was washed with an aqueous potash solution and then with water. It was dried to eliminate the ether. The residue after drying was distilled under vacuum, yielding:

(1) At 95°–105° C./0.4 mm. of mercury: 8.9 g. of unreacted lauryl bromide;

(2) At 195°–210° C./0.4 mm. of mercury: 8.5 g. of secondary amine (ditridecylamine);

(3) At 239°–245° C./0.4 mm. of mercury: 85.3 g. of ditridecylamine, titrating as 100%; the conversion was 84%; the yield was 95%, taking into account the lauryl bromide recovered.

It will be seen that the process of the invention allows trialkylamines to be obtained in high yields and in a relatively simple manner.

What we claim is:

1. In a process for obtaining trialkylamines, the steps of
   (a) mixing an alkyl bromide having from six to eighteen carbon atoms in an amount on the order of from 5 to 10% (molar) in excess of the stoichiometric proportion with a compound selected from the group consisting of mono and dialkylamines having an alkyl radical containing from six to eighteen carbon atoms,
   (b) heating said mixture to a temperature in the range of from 120° C. to 178° C., and then
   (c) diffusing gaseous ammonia through said mixture until reaction between the ammonia and said alkyl bromide is completed.

2. A process as described in claim 1 in which said alkylbromide and the alkyl radicals of said mono and dialkylamines contain from 8 to 18 carbon atoms.

3. A process as described in claim 1 including the step of adding to said mixture about 1% by weight of said mixture of cuprous iodide.

References Cited by the Examiner
UNITED STATES PATENTS

| | | | |
|---|---|---|---|
| 1,932,518 | 8/28 | Hale | 260—585 |
| 2,192,523 | 3/37 | Olin et al. | 260—583 |

CHARLES B. PARKER, *Primary Examiner.*

L. ZITVER, *Examiner.*